US011766057B2

United States Patent
Haugland (10) Patent No.: US 11,766,057 B2
(45) Date of Patent: Sep. 26, 2023

(54) TEMPERATURE CONTROLLED THAWING METHOD AND APPARATUS

(71) Applicant: Icefresh AS, Ålesund (NO)

(72) Inventor: Anders Haugland, Os (NO)

(73) Assignee: Icefresh AS, Stavanger (NO)

( * ) Notice: Subject to any disclaimer, the term of this patent is extended or adjusted under 35 U.S.C. 154(b) by 0 days.

(21) Appl. No.: 17/350,501

(22) Filed: Jun. 17, 2021

(65) Prior Publication Data

US 2021/0307368 A1    Oct. 7, 2021

Related U.S. Application Data

(62) Division of application No. 15/777,381, filed as application No. PCT/EP2016/078697 on Nov. 24, 2016, now Pat. No. 11,071,314.

(30) Foreign Application Priority Data

Nov. 24, 2015   (EP) ..................... 15196043
Feb. 5, 2016    (EP) ..................... 16154474

(51) Int. Cl.
| | |
|---|---|
| A23L 3/365 | (2006.01) |
| F25D 17/06 | (2006.01) |
| F28F 27/00 | (2006.01) |
| G05D 23/19 | (2006.01) |
| G05D 23/20 | (2006.01) |

(52) U.S. Cl.
CPC ............. *A23L 3/365* (2013.01); *F25D 17/06* (2013.01); *F28F 27/00* (2013.01); *G05D 23/1927* (2013.01); *G05D 23/20* (2013.01)

(58) Field of Classification Search
CPC ..... A23L 3/365; F25D 17/06; G05D 23/1927; G05D 23/20; F28F 27/00
See application file for complete search history.

(56) References Cited

U.S. PATENT DOCUMENTS

| | | |
|---|---|---|
| 3,976,122 A | 8/1976 | Neidhardt |
| 4,453,066 A | 6/1984 | Mori |
| 4,520,251 A | 5/1985 | Yokozeki |
| 4,812,622 A | 3/1989 | Takeda et al. |
| 5,326,578 A | 7/1994 | Yun |
| 5,441,098 A | 8/1995 | Kristensen |
| 11,071,314 B2 * | 7/2021 | Haugland .............. A23L 3/365 |
| 2004/0052913 A1 | 3/2004 | Uchida et al. |
| 2004/0066835 A1 | 4/2004 | Drews |
| 2004/0139863 A1 | 7/2004 | Boryca et al. |
| 2009/0236335 A1 * | 9/2009 | Ben-Shmuel ...... B65D 81/3453 219/710 |
| 2014/0178539 A1 | 6/2014 | McCormick et al. |
| 2015/0237908 A1 | 8/2015 | Burkett et al. |

(Continued)

FOREIGN PATENT DOCUMENTS

| | | |
|---|---|---|
| EP | 2926675 A1 | 10/2015 |
| WO | WO 02/41713 A1 | 5/2002 |

OTHER PUBLICATIONS

International Search Report for PCT/EP2016/078697 dated Feb. 22, 2017.

*Primary Examiner* — Marc E Norman
(74) *Attorney, Agent, or Firm* — Knobbe Martens Olson & Bear, LLP (57) ABSTRACT

The present invention relates to a method of thawing and an apparatus for performing the method.

11 Claims, 5 Drawing Sheets

(56) References Cited

U.S. PATENT DOCUMENTS

2018/0263251 A1  9/2018 Sato et al.
2019/0141799 A1  5/2019 Mongin et al.
2020/0109892 A1  4/2020 Zhu et al.

* cited by examiner

TEMPERATURE CONTROLLED THAWING METHOD AND APPARATUS

CROSS REFERENCE TO RELATED APPLICATIONS

This application is a divisional application of U.S. patent application Ser. No. 15/777,381, filed on May 18, 2018, which is the U.S. National Phase Application of PCT International Application No. PCT/EP2016/078697, filed on Nov. 24, 2016, designating the United States of America and published in the English language, which is an International Application of and claims the benefit of priority to European Patent Application No. 15196043.2, filed on Nov. 24, 2015, and European Patent Application No. 16154474.7, filed on Feb. 5, 2016. The disclosures of the above-referenced applications are hereby expressly incorporated by reference in their entireties.

FIELD OF THE INVENTION

The present invention relates to a method of thawing and an apparatus for performing the method.

BACKGROUND OF THE INVENTION

Melting of frozen water in food products is denoted as thawing. The phase change requires energy, and takes place at a constant temperature for pure water. However, for mixtures of water, fat, protein, carbohydrates and ashes, such as foodstuffs, this phase change will take place at a gliding temperature. Further, due to the phase change of water during thawing, the thermal properties and density of foodstuff will vary during the thawing process. Also, an increased heat flow resistance as thawing proceeds result in a process that runs slower and slower until thawing is completed.

The maximum temperature difference ($\Delta T$) that can be used in thawing processes is limited by quality considerations. The use of too high thawing media temperature can lead to denaturation of proteins with reduced chemical, visual and sensory quality as a result. Because of this, the typical temperature difference, i.e. the driving force of the process, is in the range of 10° C. to 20° C. These and other aspects result in thawing processes that are difficult to carry out with respect to predictability and controllability.

Known process for thawing foodstuff using a flowing medium such as air are associated with various drawbacks. The surface layers of foodstuff that are not protected with packing, easily reaches a temperature equal to the surrounding air stream. This results in moisture transport to the airstream from the product leading to dehydration, i.e. drying of the product, with a negative effect on sensory quality. Dehydration may be avoided by introducing water damp to the air. A humid environment however stimulates bacterial activity, which is undesirable. This is, in particular the case for thawing system using flowing air, as bacteria may be circulated in the system and deposited on system surfaces that are difficult to clean.

Controlling known process using air temperature sensors, surface temperature sensors and sensor measuring the core temperature of thawed products is also troublesome. Especially arranging individual sensors on large quantity of individual products is time consuming. Using core temperature sensors on individual packet products or portion packs may also compromise products and result in discharge of products. In addition, sensors arranged on the outside of individual packed products or portion packs may not give the necessary accuracy in measurements, which may also lead to reduced thawing quality. Individual packed products or portion packs may on the other hand be advantageous in terms of hygiene.

For example, a defrosting apparatus such as the one described in U.S. Pat. No. 4,812,622 is known for accommodating articles to be defrosted. This apparatus does not monitor the resistance to transfer of heat within the articles to be defrosted and thus do not react over dynamic changes of the resistance resulting in a poor control over the application of heat to the articles.

Hence, it would be advantageous with new methods and apparatus that can be used for thawing quantities of organic material, such as foodstuff, in portion packings in a short time with consistent quality. Each portion pack should advantageously be thawed at the same point in time and been subjected to equal thawing processes. Such methods and processes would in particular de advantageous in distribution from production facility to shops, large households, restaurants, cafeterias, etc. By short time is meant a thawing process with a duration of about 45 minutes up to 3 hours, from being of thawing process until the product is sufficiently thawed and comparable to a fresh product. Further, it would be advantageously of such process could be controlled by personnel without particular training or other proficiencies. Further, it is required that the thawed product appears with the same taste and texture as a similar fresh product.

OBJECT OF THE INVENTION

It is an object of the present invention to provide a method and an apparatus for fast thawing frozen organic material at hight speed without degradation of the organic material.

It may be see as an object of the invention to provide a method and an apparatus for fast thawing frozen organic material while keeping its high quality, without deterioration of the quality of the organic material while thawing.

A further object of the present invention to provide a method and an apparatus for fast thawing frozen organic material without the need on an expert operator.

An object of the present invention is to provide an alternative to the prior art.

In particular, it may be seen as a further object of the present invention to provide a method and an apparatus for thawing frozen organic material, such as pieces of frozen fish, in a short time, while avoiding damaging the thawed material caused by denaturation or by cell wall destructions.

SUMMARY OF THE INVENTION

During thawing of an organic material the product core temperature, TC will be lower than product surface temperature, TS. The thermal core/centre of the product will thus undergo the slowest thawing process and therefore experience the lowest temperature at any time throughout the thawing process. In this regard, the heat transfer process can be divided into two steps. Heat transferal from the surrounding media to the product surface and heat transferal from the product surface towards the product thermal core.

The thawing methods according to aspects and embodiments of the invention are based on the surprising findings of the inventors related to the heat transfer resistance of organic material being thawed. During the thawing process, the heat transferal resistance of organic material is initially dominated by an outer heat transferal resistance. During this phase, the heat supplied to the product surface is efficiently transported into the core and TC and TS increase at the same rate. However, as the thawing progresses, the heat transferal resistance shifts to be dominated by an inner heat transferal resistance. When this change, or shift, in heat transferal resistance, or in dominance of heat transferal resistance, takes place, it is of the uttermost importance that the temperature of the thawing medium, such as flowing air, is regulated to prevent damage of the organic material due to, for example degradation of the organic material, such as protein denaturation. If too high temperatures are applied following the change in heat transferal resistance, the temperature of the surface layers of the thawed product will rapidly increase to the temperature of the thawing medium. In this regard, it is noted that a constant lower temperature for the thawing medium would not have negative effects on the organic material. However, the lower driving force for the thawing process due to the lower temperature would have the drawback of prolonging the thawing time and thus the length of the thawing process. The inventors have devised the invention observing that when the shift in heat transferal resistance takes place this will result in a measurable increased in temperature variations in the thawing medium. Hence, by monitoring variations in the temperature of the thawing medium or variations of other parameters induced by temperature variations, it is possible to determine when the above-explained change in heat transferal resistance takes place. This method for determining the change in heat transferal resistance may advantageously be used in the thawing process to determine when the temperature of the thawing medium should be adjusted to avoid damaging the organic material. This is in particular, the case for thawing processes including quantities of individual packed products, as the method does not require nor is regarded feasible to make use of individual sensors on each product.

Thus, the above described object and several other objects are intended to be obtained in a first aspect of the invention by providing a method of thawing an organic material, the method comprising: arranging the organic material in a thawing compartment of a thawing apparatus, wherein the organic material is subjected to a thawing medium; thawing the organic material by circulating the thawing medium reaching within said thawing compartment a first temperature, $T1$, through the thawing compartment; monitoring a heat transfer resistance of the organic material to detect a shift between outer heat resistance transferal and inner heat resistance transferal of the organic material; and when the shift is detected: lowering the temperature of the thawing medium to a second temperature, $T2$, wherein $T2$ is lower than $T1$; and thawing the organic material further by circulating the thawing medium reaching said $T2$ through the thawing compartment.

According to the first aspect, an organic material, such as pieces of frozen fish, is arranged in a thawing compartment, such as a defrosting compartment of a thawing apparatus, such as a defrosting cabinet. When being arranged in the thawing compartment, the batch or individual pieces of organic material may be identified for example by using bar codes or electronic tags provided on the individual products or batches of products. This may ensure that only authorised products are arranged in the thawing compartment.

In that, the organic material may comprise logging means so that the organic material may be correctly identified.

In the thawing compartment, the organic material is subjected to a thawing medium, such as heated flowing air, which is circulated through the thawing compartment. Due to the temperature of the thawing medium, which is higher than the temperature of the organic material, while the thawing medium is circulating, the organic material will thaw. During the first phase of the thawing process, the thawing medium is introduced at an average temperature $T$ so as to reach the first temperature, $T1$.

Thus, in some embodiments, the thawing medium may be introduce at a temperature $T1$.

In some other embodiments the thawing medium may be introduce at a temperature slightly higher than $T1$.

$T1$ may be between 10° C. and 30° C. The temperatures used in the thawing process are closely related to the type of organic material being thawed, thus identification of the organic material contained in the thawing compartment provide also indication of the set point temperature $T1$.

For example, the temperatures used in the thawing process, such as $T1$ and $T2$, can be gathered from information barcodes or electronic tags. In some embodiments, the organic material is a frozen organic material, such as pieces of frozen fish.

For example, salmon (Salmo salar) which is a fish with a high fat content, may for example be subjected to higher temperatures than fish, such as cod (Gadus morhua), with a lower fat content. Similar, different batches of the same type of organic material may require different temperatures due to material variations, caused, for example, by the water content of the flesh, by the flesh quality or by the season of the year when the fish was caught or by temperature differences of the waters where the fish have been living, thus also caused by the latitude wherein the fish have been living. Other factors that may vary $T1$ are the shape of the organic material.

Thus, in general, temperature set point $T1$ and $T2$ depend on the type and conditions of the organic material that need to be thawed.

Monitoring of the heat transfer resistance is thus defined as monitoring the resistance against heat or energy transport from the media to the organic material As describe above, the heat transfer process may be divided into: heat transferal from the surrounding media to the product surface and heat transferal from the product surface towards the product thermal core.

Depending on the thawing media properties and its circulation characteristics, and the composition and geometric size of the thawing object, either the energy transferal to the surface from the thawing media or the transferal through the thawed material into the freezing front will be the speed limitation of the process. The method of the invention aims at the identification of the point in which this shift between the dominance of the two processes occurs so as to take opportune action in order to avoid degradation of the organic material to be thawed.

Through the monitoring of the heat transfer resistance the shift or change between the outer heat resistance transferal or dominance of the outer heat resistance transferal and the inner heat resistance transferal or the dominance of the inner heat resistance transferal can be detected.

According to the invention the monitoring of the heat transfer resistance and the detection of the shift or change in the heat transfer resistance may be done by monitoring an opportune parameter having variation induced by the variation of the heat transfer resistance.

When the shift is detected, the temperature of the thawing compartment is lowered to the temperature $T2$ by circulating the thawing medium having an average temperature $T$ equal to $T2$ or lower through the thawing compartment.

The shift or change is between the outer heat resistance transferal and inner heat resistance transferal or between dominance of one of the two.

Dominance of one or the other occurs when resistance to heat transferal is due to more than 50% to one of the two. For example, if more than 50% of the resistance to heat transfer is due to the resistance of the surface of the organic material it may be correct to refer to it as dominance of the outer heat resistance transferal.

In some embodiments, spectroscopic monitoring, i.e. monitoring of colour changes, light reflection or absorption within UV-Vis or N.I.R. of the organic material exposed to electromagnetic radiation, such as within the UV-Vis and N.I.R., may be used as an opportune parameter to evaluate the shift.

In some other embodiments, acustic monitoring, i.e. monitoring of the acustic response of the organic material exposed to sound waves, may be used as an opportune parameter to evaluate the shift.

In some embodiments, the monitoring is or comprises monitoring temperature variations of the thawing medium from T1 during the circulating.

In general, optimal defrosting can only be achieved when energy is evenly distributed. As mentioned above, the process is challenged because energy is absorbed differently during the thawing process.

In the first stage or phase of thawing, the heat resistance between the defrosting cabinet and the core of the product is mainly in the thawing medium surrounding the product. The maximum energy exchange during thawing occurs during this first stage.

As along as the thawing medium temperature is fluctuating around the first temperature T1, i.e. the designed set point, the outer surface of the product is still frozen and a linear development in heat exchange can be observed. However, as soon as the product starts to melt, the heat resistance moves from thawing medium to product. This leads to a very strong reduction of heat exchanged vs time. If, at this stage, temperature T1 is kept, outer surface temperature of the product may increases rapidly and thus cause degeneration of the product and thus deterioration of the quality of the product while thawing from frozen to fresh.

The method of the invention suggests the reduction of the temperature at this stage in order to prevent product surface temperature to get too high with permanent negative impact on product quality.

According to the invention, shift between heat resistance transferal dominance can be detected by monitoring, such as continuously monitoring, temperature variation or fluctuation.

Thus with the aim of supplying as much energy as possible to the product before the change of temperature becomes necessary, the method according to the first aspect monitors the development of energy transfer and when the shift is detected, based on the fluctuation of the temperature, the temperature is reduced to T2, thus switching to the second stage of thawing when the development in energy exchange is no longer linear.

According to the method of the invention, this development in dominance of heat/energy exchange can be identified directly through the monitoring of the fluctuation of the average temperature in the defrosting cabinet.

This shift, according to some aspect of the invention, may also be identified through readings of the energy consumption of different components in the defrosting cabinet.

The method according to the first aspect of the invention optimizes the thawing process by thawing the organic material as fast as possible avoiding deterioration, i.e. by providing maximum heat when heat transfer is faster and the organic material is still frozen and by reducing the amount of heat when heat is slowed by the change in resistance to heat transfer, i.e. when the organic material begins to thaw.

In that, temperature T1 and T2 as well as the length of the period at which the organic material is exposed to T1 and T2 are linked.

Indeed the heat/energy necessary to defrost the organic material is the same independently from how this heat/energy is released to the organic material. However the method according to the first aspect of the invention optimizes this heat/energy release to the organic material, i.e. by releasing most of the heat when the organic material absorbs more and by reducing this release when the organic material absorb less.

The degree of average temperature fluctuation from T1 is thus an indirect indication of the heat resistance of the organic material.

In some embodiments, the monitoring comprises monitoring a frequency of the temperature variations of the thawing medium from T1 during the circulating.

In some other embodiments, the monitoring comprises monitoring an amplitude of the temperature variations of the thawing medium from T1 during the circulating.

In some other embodiments, the monitoring comprises monitoring an amplitude and a frequency of the temperature variations of the thawing medium from T1 during the circulating.

The variation of temperature fluctuation can be quantified as frequency and amplitude of the temperature variation.

In some embodiments, the shift is detected when the monitoring shows that the monitored frequency and/or amplitude of the temperature variations from T1 differ/s at least by 5% from an average amplitude value and/or an average frequency value.

In some further embodiments, the shift is detected when the monitoring shows that the monitored frequency and/or amplitude of the temperature variations from T1 differ/s between 5% and 30%, such as at least by 10%, from an average amplitude value and/or an average frequency value.

In some further embodiments, the shift is detected when the monitoring shows that the monitored frequency and/or amplitude of the temperature variations from T1 differ/s between 10% and 25%, such as at least by 20%, from an average amplitude value and/or an average frequency value.

Differing at least by 5% is defined as being 5% higher or lower in value. Accordingly, variations may be at least 5%, 10%, 20% or 25% higher or lower.

When this fluctuation exceed a specific value, shift in the heat resistance occurs. The specific value is an average frequency or average amplitude of the recorded values during a specific time period.

The specific time period may be between 1 to 120 seconds.

The average amplitude or frequency is calculated after real monitored, i.e. measured temperatures have over-shoot or under-shoot the set point temperature, being the the set point temperature T1, at least two times for a specific time frame. The specific time frame may be between 1 and 120 seconds, such as between 5 and 100 seconds. For example the specific time frame may be 20, 40, 60 or 80 seconds. The average is than calculated from the next over/under shoot in respect to T1.

Over-shoot or overshoot is the occurrence of a signal exceeding its target, i.e. the occurrence of a measured temperature exceeding, i. e. going above the set point temperature, i.e. T1.

Under-shoot or undershoot is on the contrary, the occurrence of a signal going below its target, i.e. the occurrence of a measured temperature going below the set point temperature, i.e. T1.

For example, if T1 is set to be 22° C., and if the temperature oscillates between 22.5 and 21.5° C., in order to detect when the shift resistance occurs the fluctuation between 22.5 and 21.5° C. is monitored. When the temperature oscillation differs at least by 5% from a specific value, i.e an average frequency or average amplitude of the recorded values during a specific time period between 1 to 120 seconds, the shift have occurred.

The calculation of the average amplitude or frequency occurs after the measured temperature went above and below the set temperature T1 at least two times during a specific time frame between 1 and 120 seconds. The average is then calculated from the next over/under shoot in respect to T1.

The frequency and/or an amplitude of the temperature variations of the thawing medium from T1 during said circulating is then monitored. The shift is detected when the monitoring shows that the monitored frequency and/or amplitude of said temperature variations from T1 differ/s at least by 5% from the average amplitude value and/or the average frequency value.

If we consider the fluctuation of the temperature as a wave function, the recording of average amplitude or frequency occurs when the first derivative, i.e. the slope of the tangent to that function, is equal to zero for two consecutive times.

In some embodiments, the average amplitude value and/or average frequency value is an arithmetic mean of the amplitude or frequency values monitored during a first thawing period.

The arithmetic mean of the amplitude or frequency values monitored during a first thawing period may be an arithmetic mean calculated after an average temperature of the thawing medium has been above T1 for a first period P1 between 1 and 60 seconds, have been subsequently below T1 for a second period P2 between 1 and 60 seconds and have been subsequently above T1 for a third period P3 between 1 and 60 seconds.

In some further embodiments, the average amplitude value and/or average frequency value may be a preferred amplitude value and/or a preferred frequency value that have been pre-set. For example, the pre-set value may be retrieved from an online or local database.

For example, said pre-set value may be the value corresponding to the amplitude and/or frequency that have been shown to be the most appropriate value for the specific organic material to be thawed.

In some further embodiments, the first thawing period is in the range between 1 and 60 seconds, such as between 10 and 50 seconds.

In some embodiments, the shift is detected when at least one of the monitored frequency and/or amplitude value of the temperature variations from T1, monitored within a second thawing period, differs at least by 5% at least once from the average amplitude/frequency.

The second thawing period may be in the range between 1 and 120 seconds, such as between 10 and 100 seconds.

In some embodiments, the average temperature of the thawing medium is a temperature value measured by one or more temperature sensors located in the thawing apparatus, such as in said thawing compartment.

The thawing compartment or defrosting cabinet may comprise one or more temperature sensors in different locations.

In some further embodiments, the average temperature is the arithmetic mean of at least two temperature values measured by one or more temperature sensors located in the thawing apparatus, such as in said thawing compartment, during a period of time between 1 to 60 seconds.

The average temperature may be the arithmetic mean of at least two temperature values measured by at least two temperature sensors located in the thawing apparatus, such as in the thawing compartment, during a period of time between 1 to 60 seconds.

In some embodiments, the monitoring comprises measuring or determining the average temperature at time intervals between 1 and 10 seconds, such as between 2 and 7 seconds, for example every 5 seconds.

In some further embodiments, the thawing the organic material further by circulating the thawing medium reaching the T2 through the thawing compartment is applied for a period of time until the organic material is desirably thawed.

Desirably thawed is defined as defrosted until less than 15% of frozen water, i.e. ice, in respect to all water content, is present in the organic material, such as between 10% and 0%, such as less than 7%, for example less than 5%. In some examples, desirably thawed may be defrosted until less than 3% of frozen water in respect to all water is present in the organic material, such as less 1%, for example less than 0.1%.

For example, desirably thawed may be defrosted until very low trance of frozen water, i.e. ice, is present in the organic material.

In some embodiments, desirably thawed may be defrosted until no trace of frozen water, i.e. ice, is present in the organic material.

The length of the period of time necessary to achieve the degree of thaw desired depends on the type of organic material as well as on the period of time during which the organic material has been exposed to temperature T1.

For example, the library data may suggest to apply a temperature T1 for X minutes and a temperature T2 for Y minutes. However, through the monitoring of the heat resistance transferal, T1 is applied only for a time period of X-Z minutes. In this case T2 needs to be applied for Y+{[(T1+16)/(T2+1)]*Z} minutes.

In other words, the amount of energy that needs to be provided to the organic 30 material is the same, while the way this energy is applied to the organic material is different. Thus, if temperature T1 is applied for less time, temperature T2 needs to be applied for longer time.

In some embodiments, the organic material arranged in the thawing compartment comprises a plurality of separate pieces of organic material arranged in separate containers, such as pieces of frozen fish.

In some further embodiments, each of the plurality of separate pieces of organic material are packed in a tight-fitting enclosing polymer film constituting the separate containers.

In some other embodiments, the method further comprises subjecting the organic material to a thawing medium reaching a third temperature, T3, wherein the temperature is in range between −3 and 0° C., such as −1° C.

T3 is the optimal storage temperature for conservation or distribution of the defrosted organic material until its use, e.g. in food preparation.

Arranging the frozen material, such as articles of food, in separate containers and thawing the organic material while in the containers contamination, provides several advantages. For example, contamination of the organic material is prevented and dehydration of the surface layers of the organic material is prevented. This, in turn, improves the sensory quality of the final thawed product.

Hereby a method is achieved wherein the organic material is thawed at the highest possible temperature, while preventing material damages such as denaturation. By being able to use the highest possible temperature, heat transfer is improved and the organic material is thawed as fast as possible, while material quality is maintained. This results in higher equipment utilization and increased thawing capacity.

In a second aspect, the invention relates to a thawing apparatus for thawing organic material, configured to be operated by a method according to the first aspect of the invention, the apparatus comprising: a housing; a thawing compartment for receiving organic material provided inside said housing; a fan for circulating a thawing medium, such as air, through the thawing compartment and a circulation channel inside the housing; a heating element arranged to heat the thawing medium being circulated; a cooling element arranged to cool said thawing medium being circulated; one or more temperature sensor(s) for measuring the temperature of the thawing medium; and a control unit communicating with said one or more temperature sensors, the heating element and the cooling element; wherein the control unit is configured to control the heating element and the cooling element to reduce the temperature of the thawing medium from a first temperature, $T1$, to a second temperature, $T2$, lower than $T1$, when variations in frequency and/or amplitude of the average temperature from $T1$ measured by the one or more temperature sensor(s) exceed an average amplitude value and/or an average frequency value due to a shift of heat transfer resistance or in dominance of heat transfer resistance of the organic material.

In a further aspect the invention relates to a thawing apparatus for thawing organic material, comprising: a housing; a thawing compartment for receiving organic material provided inside said housing; a fan for circulating a thawing medium, such as air, through the thawing compartment and a circulation channel inside the housing; a heating element arranged to heat the thawing medium being circulated; a cooling element arranged to cool said thawing medium being circulated; one or more temperature sensor(s) for measuring the temperature of the thawing medium; and a control unit communicating with said one or more temperature sensors, the heating element and the cooling element; wherein the control unit is configured to control the heating element and the cooling element to reduce the temperature of the thawing medium from a first temperature, $T1$, to a second temperature, $T2$, lower than $T1$, when variations in frequency and/or amplitude of the average temperature from $T1$ measured by the one or more temperature sensor(s) exceed an average amplitude value and/or an average frequency value due to a shift of heat transfer resistance or in dominance of heat transfer resistance of the organic material.

In some embodiments, the thawing apparatus further comprises a fluid permeable wall arranged upstream of the thawing chamber, for controlling the flow of the thawing medium entering the thawing chamber, wherein the fluid permeable wall comprises a plurality of perforations arranged to allow a substantial even distribution of thawing medium throughout the thawing compartment.

In some further embodiments, the one or more temperature sensors are configured to measure a temperature of the thawing medium 12-60 times per minute.

In some other embodiments, the thawing compartment comprises a plurality of trays adapted for receiving a plurality of separate pieces of organic material arranged in separate containers.

In some embodiments, the thawing apparatus further comprises logging means for identifying the organic material, a batch of organic material or each of the plurality of separate pieces of organic material to be arranged in the thawing compartment, and based on this identification, receiving from a local or online database, material specific information about the identified organic material.

The present invention is in particular advantageous when thawing separately packed pieces of organic material for the following reasons. When separately packed pieces are thawed, it is currently not possible to measure surface temperature with sufficient accuracy in an industrial set up. Further, it is not possible to arrange sensors for measuring the core temperature of the material due to the enclosing packing. In addition, arranging sensors on a large number of individual packages is time consuming and not very efficient.

In some embodiments, the material specific information comprises information about suitable first temperature, $T1$, second temperature, $T2$ and third temperature $T3$, related to the specific organic material, and the control unit is adapted to use information about $T1$ and $T2$ to set $T1$ and $T2$ during the thawing process.

In some further embodiments, the logging means is a bare code reader for reading barcodes provided on said containers of said organic material or an RFID-reader adapted for receiving information from an RFID-tag provided on containers of the organic material.

For example, logging means may be also QR code or any means for conveying specific product information about the organic material to the thawing apparatus.

The material specific information may contain information about the type of material, weight, volume, shape, catch time, durability, preferred thawing temperatures, the total amount of energy required to thaw the organic material, etc. The identification of the organic material may also be used to ensure that only authorised organic material is thawed in the thawing apparatus. Identification of the products to be thawed may thus be a prerequisite for initiating the thawing process. This may help to improve product quality and safety as use of the thawing apparatus for unintended purposes is prevented In some embodiments, different type of organic materials may be thawed during the same process.

The first, second and third and other aspects and/or embodiments of the present invention may each be combined with any of the other aspects and/or embodiments. These and other aspects and/or embodiments of the invention will be apparent from and elucidated with reference to the embodiments described hereinafter.

BRIEF DESCRIPTION OF THE FIGURES

The thawing method and apparatus according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Thawing Method

During the thawing process, the temperature of the thawing medium is constantly monitored to identify variations caused by the change in heat transfer resistance of the organic material. When variations (frequency and amplitude) in the temperature exceed a predefined temperature range, the temperature of the thawing medium is lowered to a second temperature, T2, which is lower than T1.

For example, the second temperature will be between 6° C. and 17° C., also dependent of the type of material thawed. The organic material is kept in the thawing compartment at the second temperature until sufficiently thawed. The total amount of energy required for sufficiently thawing the material, and thus the thawing time required, depends on the product and the temperatures used in the thawing process. This may be used to control the duration of the second phase of the thawing process.

Following the second phase the temperature of the thawing medium may be further reduced to approximately −1° C., for a third phase of the thawing process. In the third phase, the organic material is subject to a relatively cold medium, which serves to stabilise the temperature of the organic material. Subjecting the organic material to such low temperature will help preserve the organic material and ensure proper cooling. In this way the surface temperatures is reduced whilst the temperature in the core of the product even out on desired level.

Figure 4:
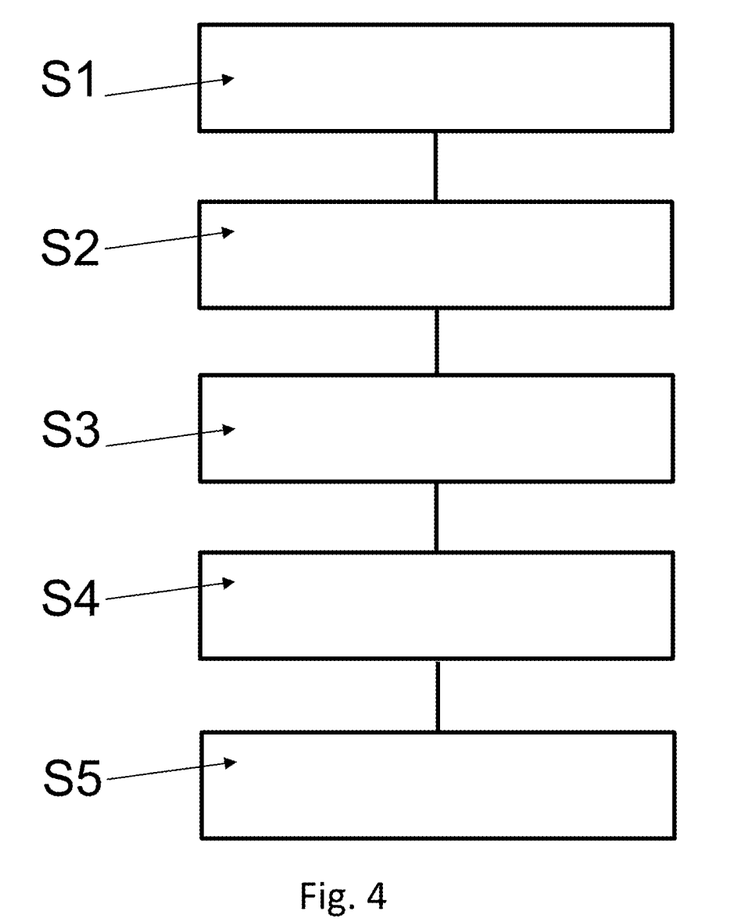
FIG. 4 is a flow-chart of a method according to some embodiments of the invention.

FIG. 4 is a flow-chart of a method according to some embodiments of the invention.

The method of thawing an organic material comprises: S1 arranging the organic material in a thawing compartment of a thawing apparatus, wherein the organic material is subjected to a thawing medium; S2 thawing the organic material by circulating the thawing medium reaching a first temperature, T1, through the thawing compartment; S3 monitoring a heat transfer resistance of the organic material to detect a shift between outer heat resistance transferal and inner heat resistance transferal of said organic material; and when the shift is detected: S4 lowering the temperature of the thawing medium to a second temperature, T2, wherein T2 is lower than T1; and S5 thawing the organic material further by circulating the thawing medium reaching the T2 through the thawing compartment.

Thawing Apparatus

Figure 1:
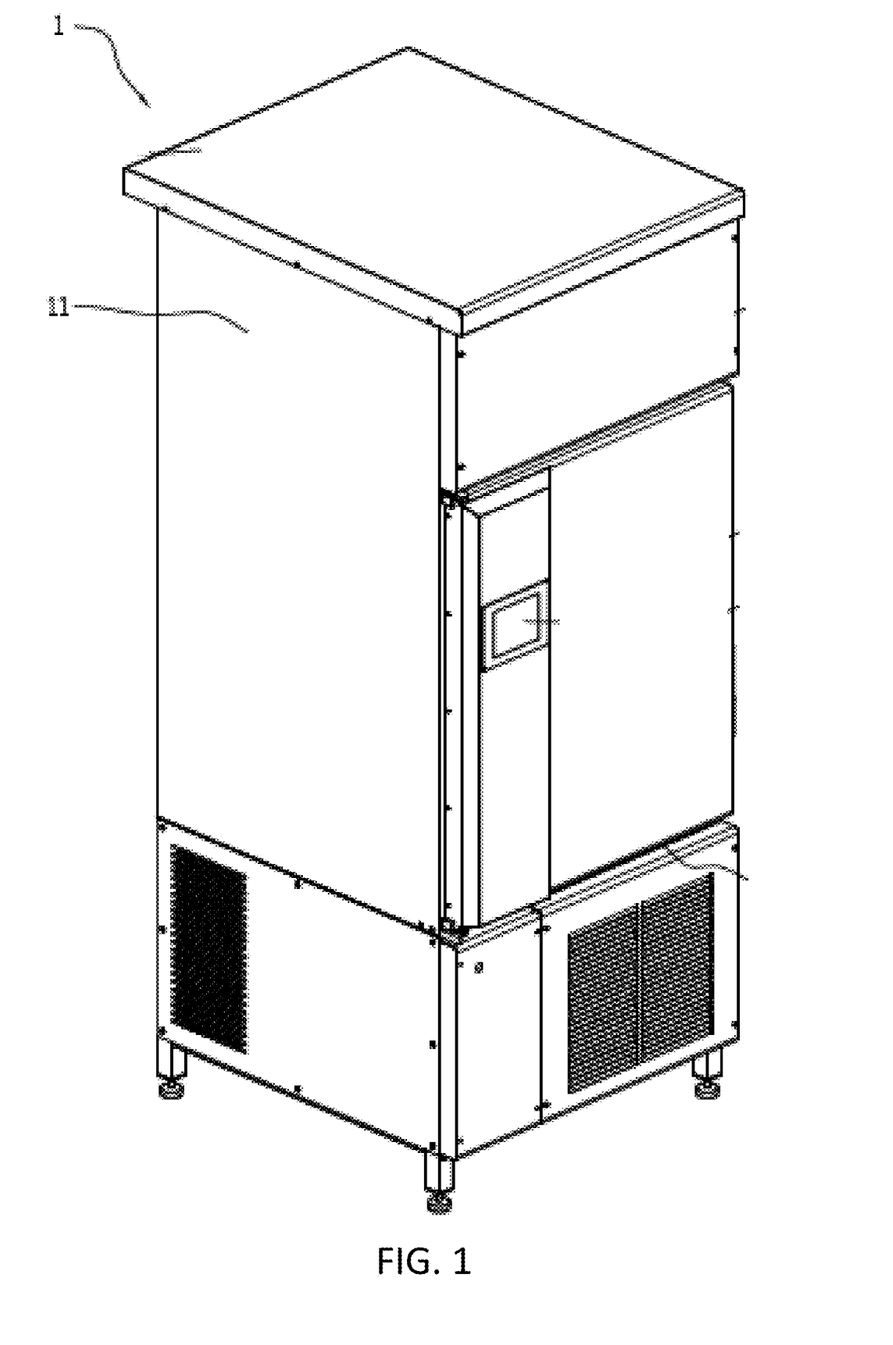
FIG. 1 is a 3D view of a thawing apparatus according to some embodiment of the invention.

FIG. 1 is a 3D view of a thawing apparatus according to some embodiment of the invention.

Figure 2:
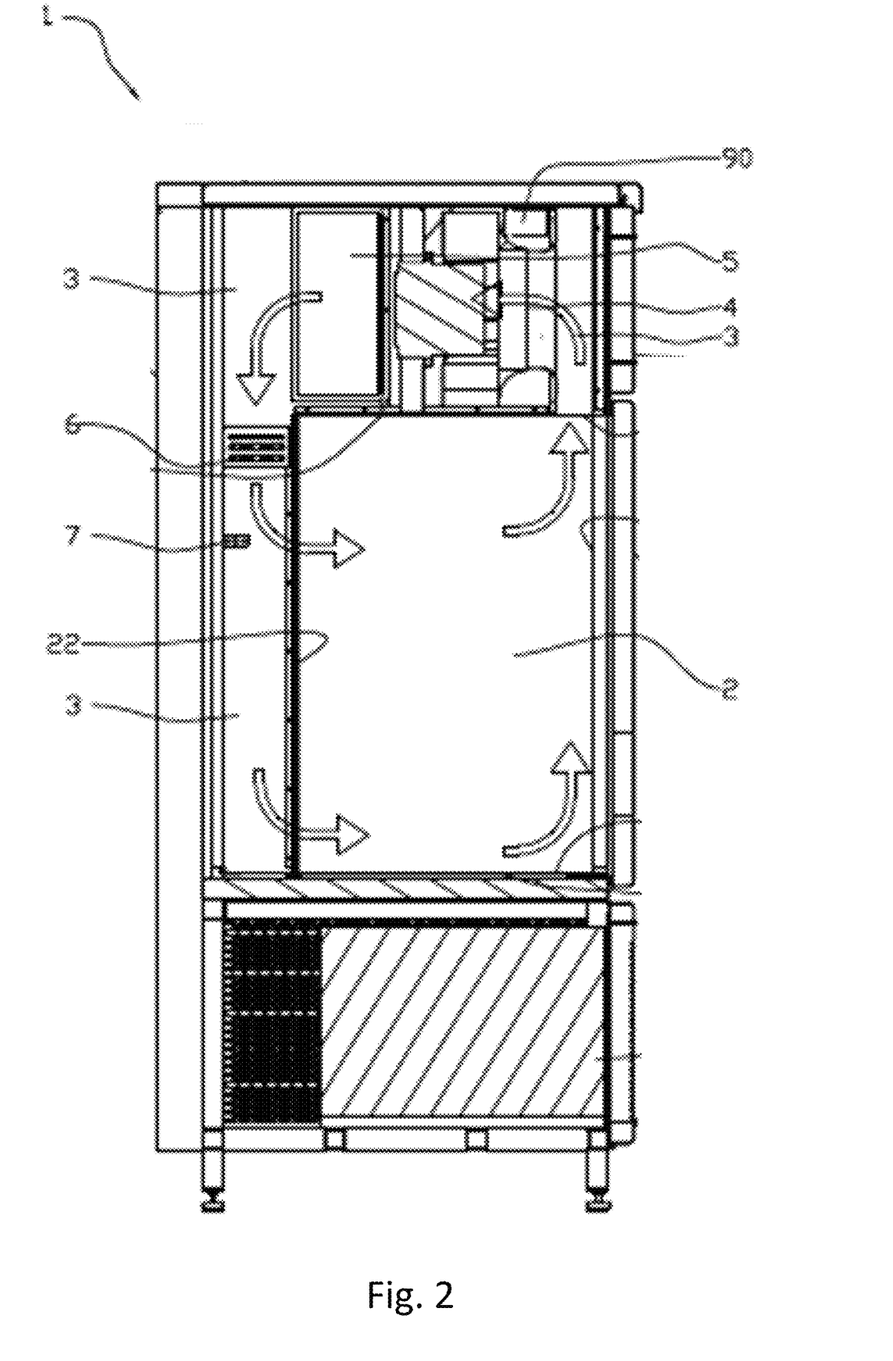
FIG. 2 is a cross section of a thawing apparatus according to some embodiment of the invention.

The thawing apparatus 1 according to an exemplary embodiment of the invention comprises a housing 11 provided with a thawing compartment 2 for receiving organic material to be thawed. A fan 4 is provided for circulating a thawing medium in the form of air, through the thawing compartment and through a circulation channel 3 as shown in FIG. 2. The circulation channel comprises and inlet and an outlet in fluid communication with the thawing compartment. Further, a heating element 5 for heating the thawing medium and a cooling element 6 for cooling the thawing medium are arranged in the circulation channel to respectively heat and cool the thawing medium being circulated.

Figure 3:
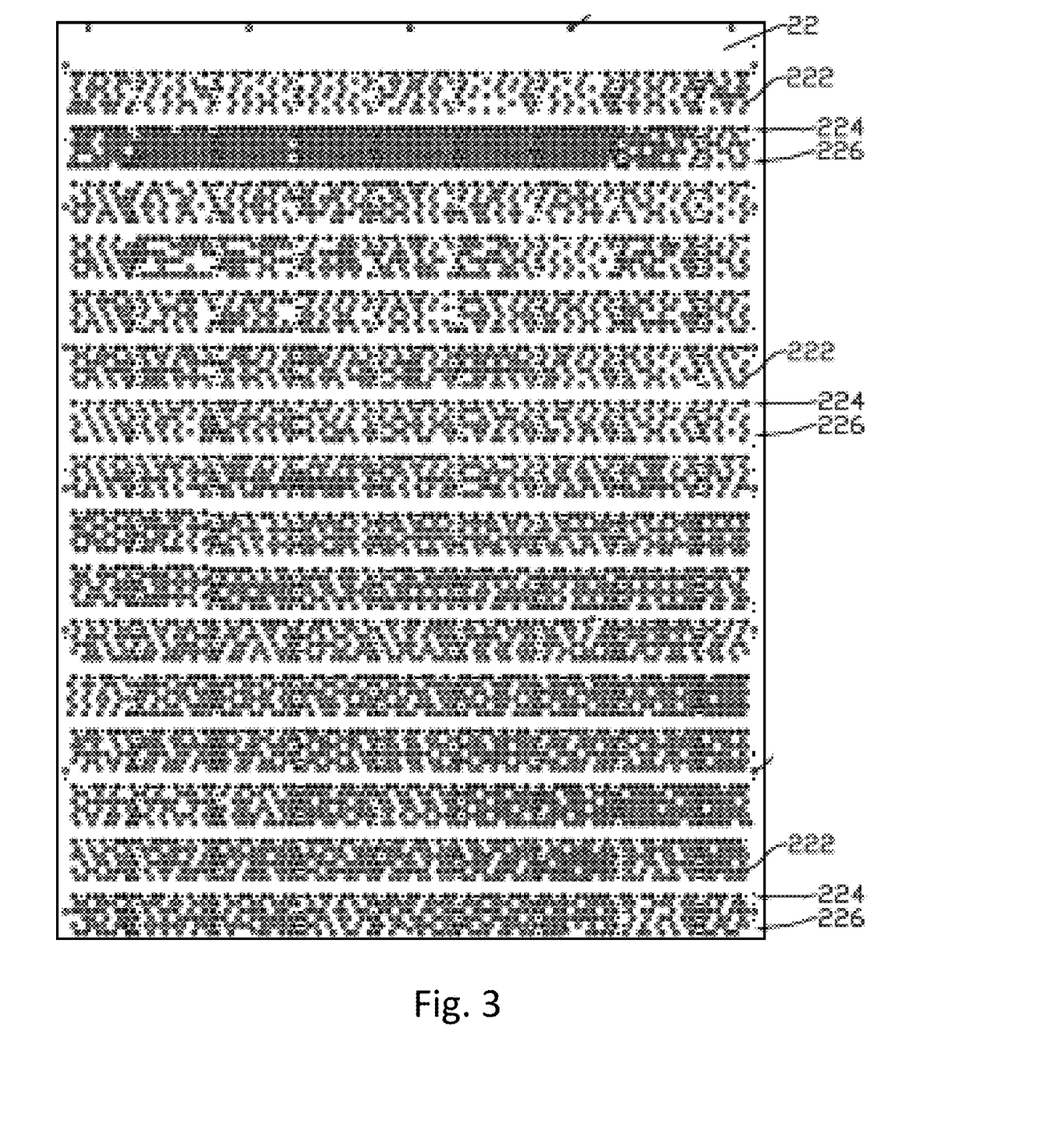
FIG. 3 is schematic representation of the perforation arranged in the back of the thawing apparatus according to some embodiments of the invention.

The circulated thawing medium enters the thawing compartment 2 through a perforated fluid permeable wall 22 arranged upstream of the thawing chamber. The permeable wall 22 controls the flow of the thawing medium entering the thawing chamber by comprising a plurality of perforations 222 arranged to allow a substantial even distribution of thawing medium throughout the thawing compartment. The perforations are arranged in rows 224 and grouped in sections 226 as shown in FIG. 3. As seen, the distance between to row of the same section is smaller than the distance between the top and bottom row of two different sections.

Downstream of the cooling element a temperature sensor 7 is arranged for measuring the temperature of the thawing medium. As envisaged by the skilled person the temperature sensor may alternatively be arranged in other positions and multiple sensors may be used. Finally, a control unit 90 for controlling operation of the thawing apparatus is provided. The control unit communicates with the temperature sensor, the heating element and the cooling element to control the temperature of the thawing medium. The control unit also controls the fan to ensure proper circulation of the thawing medium. The distance between the different sections 226 correspond to trays (not shown) that may be arranged in the thawing compartment. Hereby the each section of perforations are positioned adjacent to a tray arranged in the thawing compartment, to control the flow of thawing medium. The number, size and position of the perforations in each section ensures that volume of flowing thawing medium is substantial the same through all the sections. Hereby all products arranged in the thawing compartment, such as portion packings arranged on different trays, are subjected to substantially the same conditions, which ensures an uniform thawing process.

The thawing apparatus is operated according to the method described above and automatically regulated the temperature level of the thawing medium during the thawing process. The temperature sensor continuously measures the temperature of the thawing medium and sends a signal to the control unit. When the control unit determines that variations in the temperature exceed the predefined temperature, signals are sent to the heating element and the cooling element to reduce the temperature of the thawing medium. Hereby the temperature of the thawing medium is reduced from the first temperature, T1, to the second temperature, T2.

Figure 5:
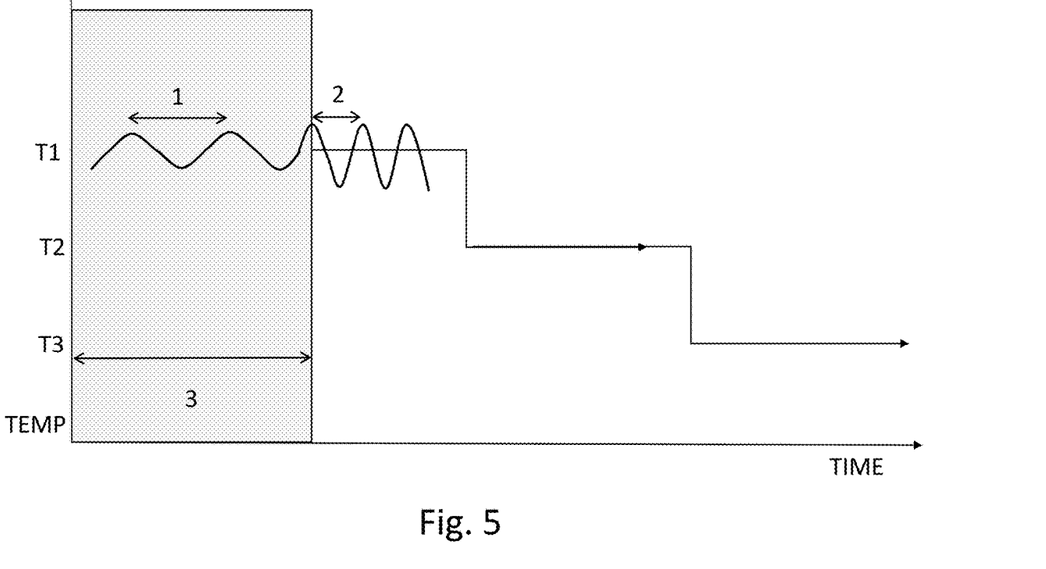
FIG. 5 is a schematic representation of a characteristic graph monitoring frequency oscillation from the set temperature (T1) vs time.

FIG. 5 is a schematic representation of a characteristic graph monitoring frequency oscillation from the set temperature (T1) vs time.

From the representation it can be seen that by monitoring the frequency vs time around the temperature T1, a clear shift in frequency, between frequency 1 and frequency 2 can be observed. This shift determines the end of the area 3 of dominance of the outer heat resistance transferal. The appearance of frequency 2 is thus an indication of a shift between the dominance of the outer heat resistance transferal and the inner heat resistance transferal.

Figure 6:
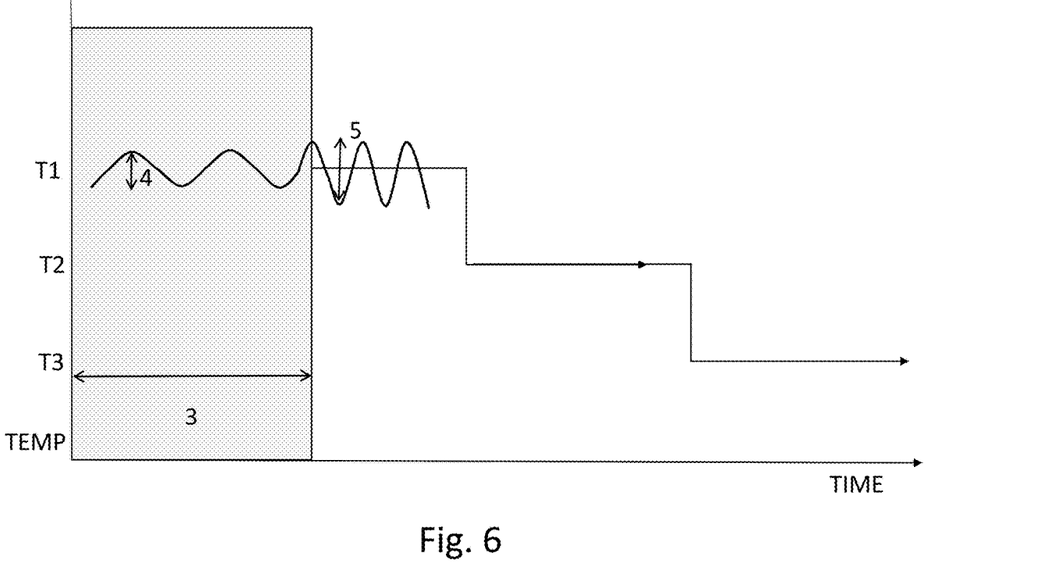
FIG. 6 is a schematic representation of a characteristic graph monitoring amplitude oscillation from the set temperature (T1) vs time.

FIG. 6 is a schematic representation of a characteristic graph monitoring amplitude oscillation from the set temperature (T1) vs time.

From the representation it can be seen that by monitoring the amplitude vs time around the temperature T1, a clear shift in amplitude, between amplitude 4 and amplitude 5 can be observed. This shift determines the end of the area 3 of dominance of the outer heat resistance transferal. The appearance of amplitude 5 is thus an indication of a shift between the dominance of the outer heat resistance transferal and the inner heat resistance transferal.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A thawing apparatus for thawing organic material, comprising:
   a housing;
   a thawing compartment configured to receive organic material provided inside said housing;
   a fan configured to circulate a thawing medium through said thawing compartment and a circulation channel inside said housing;
   a heating element configured to heat said thawing medium being circulated;
   a heat exchanger configured to cool said thawing medium being circulated;
   one or more temperature sensors, which measure the temperature of said thawing medium; and
   a controller communicating with said one or more temperature sensors, said heating element and said heat exchanger;
   wherein said controller is configured to:
   control said heating element and said heat exchanger to reduce the temperature of said thawing medium from a first temperature, T1, to a second temperature, T2, lower than T1;
   monitor a heat transfer resistance of said organic material by monitoring temperature variations from T1 of said thawing medium during circulating and by monitoring a frequency or an amplitude of said temperature variations of said thawing medium from T1 during circulating; and
   detect a shift between outer heat resistance transferal and inner heat resistance transferal of said organic material, said shift being detected when said monitoring shows that said monitored frequency or amplitude of said temperature variations from T1 differs at least by 5% from an average amplitude value or an average frequency value, wherein the average amplitude or frequency is calculated after measured temperature has over-shot or under-shot T1 at least two times for a specific time frame.

2. The thawing apparatus according to claim 1, further comprising a fluid permeable wall arranged upstream of the thawing chamber, for controlling the flow of the thawing medium entering the thawing chamber, wherein the fluid permeable wall comprises a plurality of perforations configured to allow a uniform distribution of thawing medium throughout the thawing compartment.

3. The thawing apparatus according to claim 1, wherein said one or more temperature sensors are configured to measure a temperature of the thawing medium 12-60 times per minute.

4. The thawing apparatus according to claim 1, further comprising a log identifying the organic material, a batch of organic material or each of a plurality of separate pieces of organic material to be arranged in the thawing compartment, and based on this identification, receiving from a local or online database, material specific information about the identified organic material.

5. The thawing apparatus according to claim 1, wherein said controller is configured to detect said shift when said monitoring shows that said monitored frequency or amplitude of said temperature variations from T1 differs between 5% and 30%, from said average amplitude value or an average frequency value.

6. The thawing apparatus according to claim 1, wherein said controller is configured to detect said shift when said monitoring shows that said monitored frequency or amplitude of said temperature variations from T1 differs between 10% and 25%, from said average amplitude value or an average frequency value.

7. The thawing apparatus according to claim 1, wherein said average amplitude value or average frequency value is an arithmetic mean of said amplitude or frequency values monitored during a first thawing period.

8. The thawing apparatus according to claim 1, wherein said average amplitude value or average frequency value is an arithmetic mean of said amplitude or frequency values monitored during a first thawing period and, wherein said arithmetic mean of said amplitude or frequency values monitored during a first thawing period is an arithmetic mean calculated after an average temperature of said thawing medium has been above T1 for a first period P1 between 1 and 60 seconds, have been subsequently below T1 for a second period P2 between 1 and 60 seconds and have been subsequently above T1 for a third period P3 between 1 and 60 seconds.

9. The thawing apparatus according to any one of claims 7 to 8, wherein said controller is configured to detect said shift when at least one of said monitored frequency or amplitude value of said temperature variations from T1, monitored within a second thawing period, differs at least by 5% at least once from said average amplitude or frequency.

10. The thawing apparatus according to claim 8, wherein said one or more temperature sensors are configured to measure said average temperature of said thawing medium and said average temperature is the arithmetic mean of at least two temperature values measured by said one or more temperature sensors, during a period of time between 1 to 60 seconds.

11. The thawing apparatus according to claim 1, wherein said controller is further configured to:
   subject said organic material to said thawing medium reaching a third temperature, T3, wherein said temperature is in range between −3 and 0° C.

* * * * *